United States Patent [19]
Steunenberg et al.

[11] 3,941,612
[45] Mar. 2, 1976

[54] CATHODE COMPOSITION FOR ELECTROCHEMICAL CELL

[75] Inventors: Robert K. Steunenberg, Naperville; Allan E. Martin, Woodridge; Zygmunt Tomczuk, Palos Hills, all of Ill.

[73] Assignee: The United States of America as represented by the United States Energy Research and Development Administration, Washington, D.C.

[22] Filed: Mar. 4, 1975

[21] Appl. No.: 555,317

[52] U.S. Cl............ 136/6 LF; 136/20; 136/100 R; 136/137
[51] Int. Cl.² ..................................... H01M 35/02
[58] Field of Search ............ 136/6 LF, 6 L, 6 R, 20, 136/83 R, 100 R, 137

[56] References Cited
UNITED STATES PATENTS

| | | | |
|---|---|---|---|
| 3,639,174 | 2/1972 | Kegelman | 136/20 |
| 3,716,409 | 2/1973 | Cairns et al. | 136/6 R |
| 3,827,910 | 8/1974 | Cairns et al. | 136/6 LF |
| 3,887,396 | 6/1975 | Walsh et al. | 136/6 L |

Primary Examiner—Anthony Skapars
Attorney, Agent, or Firm—Dean E. Carlson; Arthur A. Churm; Hugh W. Glenn

[57] ABSTRACT

A high-temperature, secondary electrochemical cell includes a negative electrode containing an alkali metal such as lithium, an electrolyte of molten salt containing ions of that alkali metal and a positive electrode containing a mixture of metallic sulfides. The positive electrode composition is contained within a porous structure that permits permeation of molten electrolyte and includes a mixture of about 5% to 30% by weight $Cu_2S$ in FeS.

7 Claims, 4 Drawing Figures

Fig—1

Fig-3
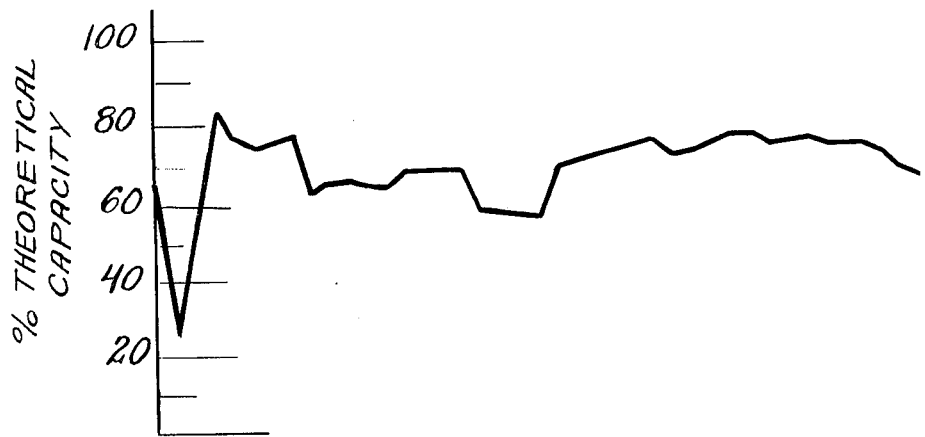
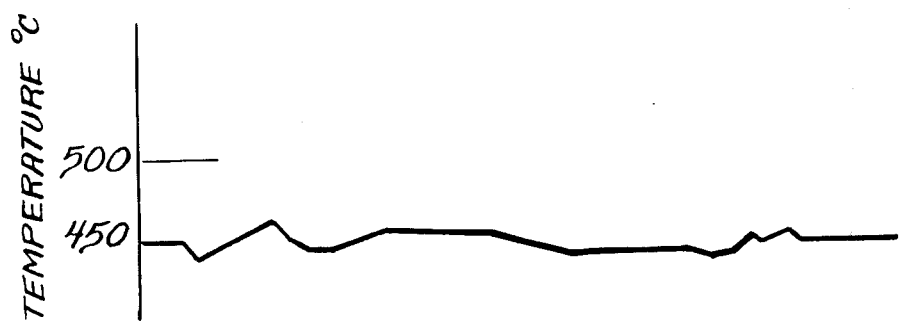
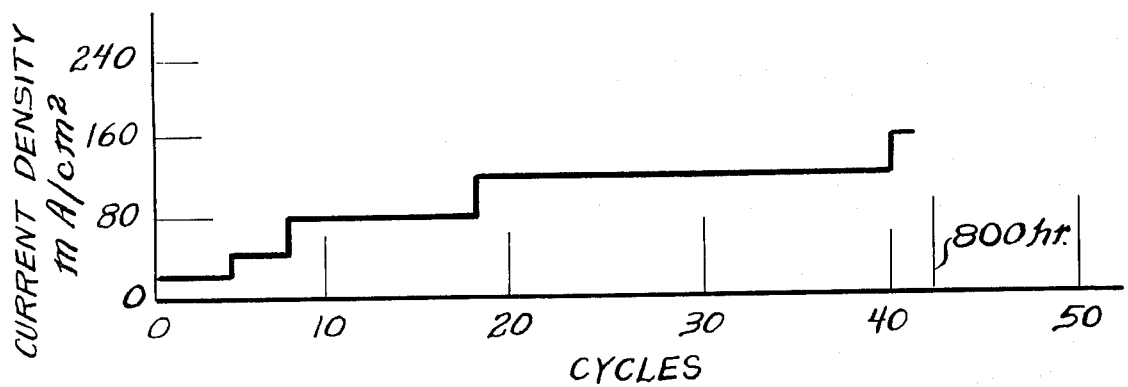

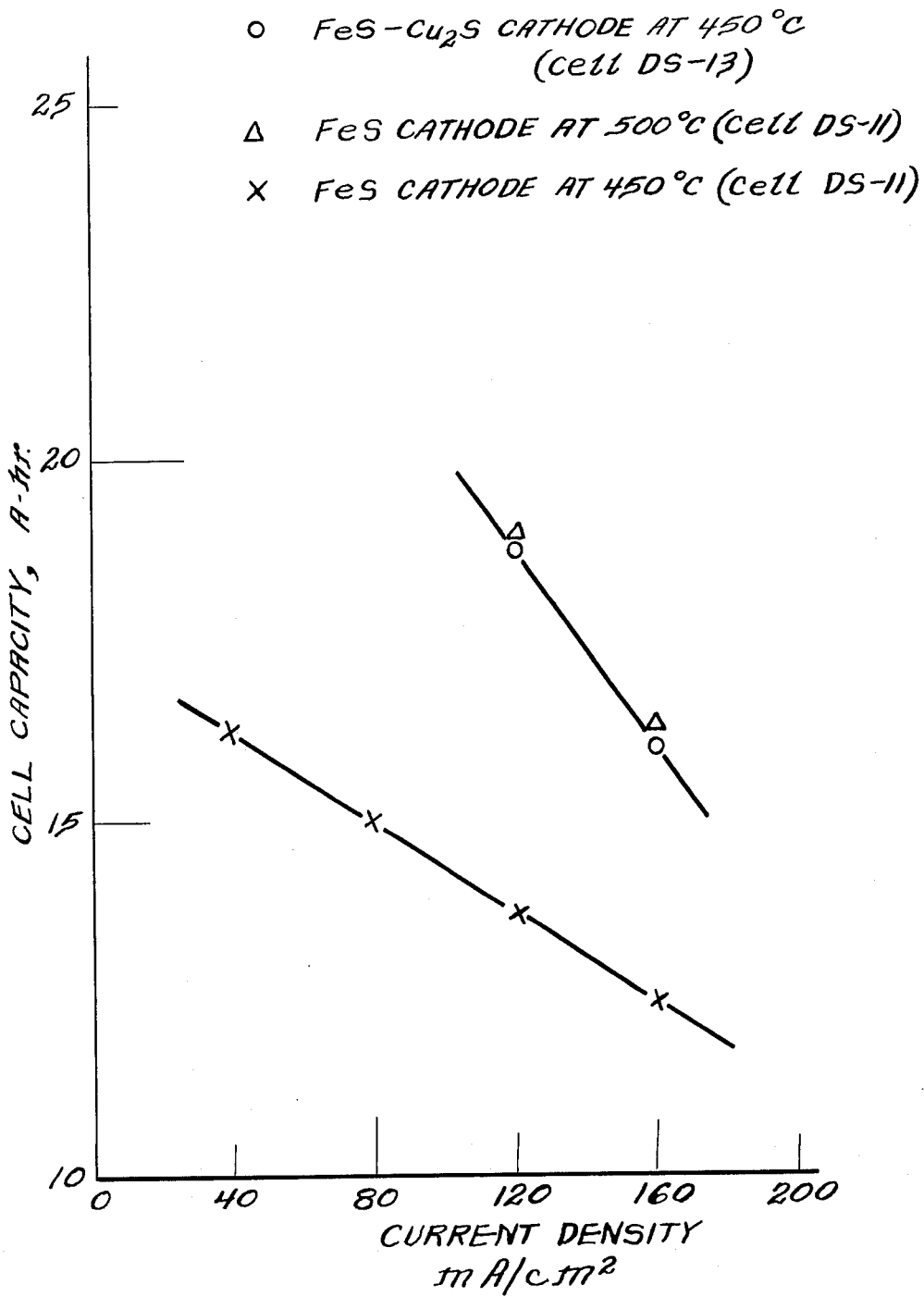

3,941,612

CATHODE COMPOSITION FOR ELECTROCHEMICAL CELL

CONTRACTUAL ORIGIN OF THE INVENTION

The invention described herein was made in the course of, or under, a contract with the UNITED STATES ENERGY RESEARCH AND DEVELOPMENT ADMINISTRATION.

BACKGROUND OF THE INVENTION

This invention relates to high-temperature, secondary electrochemical cells and batteries of such cells that can be employed as power sources for electrical automobiles, hybrid electric vehicles or for the storage of energy generated during intervals of off-peak power consumption. It is particularly applicable to electrochemical cells that employ metal sulfides as positive electrode (cathode) reactants and alkali metals as negative (anode) electrode reactants.

A substantial amount of work has been done in the development of these types of electrochemical cells and their electrodes. Various type cells showing promise have employed lithium, lithium-aluminum alloy or sodium as the reactant within the negative electrode. In the positive electrode, the chalcogens, particularly sulfur and sulfur compounds, have been used. Electrolytes of molten salt generally containing the ions of the negative reactant provide ionic conduction between the electrodes. Examples of these secondary, high-temperature cells are disclosed in U.S. Pat. Nos. 3,827,910 to Cairns et al., entitled "Homogeneous Cathode Mixtures for Secondary Electrochemical Power-Producing Cells", Aug. 6, 1974; 3,716,409 to Cairns et al., entitled "Cathodes for Secondary Electrochemical Power-Producing Cells", Feb. 13, 1973; and 3,488,221 to Hiroshi Shimotake et al., Jan. 6, 1970. A number of other pending patent applications relating to these type cells include ERDA case No. S-44,393, Ser. No. 510,840 to Yao et al. and entitled "Electrochemical Cell Assembled in Discharged State", filed Sept. 30, 1974 and ERDA case No. S-43,384, Ser. No. 416,311 entitled "Modular Electrochemical Cell", now U.S. Pat. No. 3,887,396, June 3, 1975, to Walsh et al. Each of these patents and patent applications are assigned to the assignee of the present application.

The iron sulfides $FeS_2$ and $FeS$ have been found to be particularly attractive sulfur compounds for use as positive electrode reactants. These materials are readily available and are much more easily contained within the cell than elemental sulfur. Although $FeS_2$ has a lower equivalent weight and generally performs better within the positive electrode than $FeS$, it reacts with and degrades iron components within the cell to form $FeS$. Consequently, inert materials such as molybdenum or tungsten are required for use in current collectors and electrical terminals in contact with $FeS_2$ cathode compositions. Contrastingly, $FeS$ is relatively inert to iron and can be operated as a positive electrode reactant in contact with iron or mild steel current collectors and terminals for long periods of time.

Positive electrode compositions employing only $FeS$ as the cathode reactant have given less than the expected performance in, for instance, reactant utilization, cell capacity and power. The addition of electrically conductive materials such as iron or carbon either as solid current collectors or as powdered materials dispersed throughout the positive electrode composition have provided only some of the desired improvements in cell performance.

One theory regarding problems in the operation of a cell employing $FeS$ reactant is the formation during the charge cycle of a new solid phase having the tentative composition of $K_2Fe_7S_8$ and possibly containing small amounts of Li. This composition or phase will hereafter be referred to as the J phase. The J phase contains substantial quantities of potassium from reaction with the electrolyte. Consequently, its formation causes a shift in the electrolyte composition that may have an adverse effect on the long-term operation of the cell as well as contribute to electrode swelling.

In previous studies with $Li/FeS$ cells, metallographic and X-ray diffraction examinations of the positive electrodes have revealed that the J phase is the dominant, solid sulfide phase in a well charged cell that originally included $FeS$ as the cathode reactant material. $FeS$ could be produced on recharge of these cells by using somewhat higher cutoff voltages. The required charge voltage for conversion of J phase to $FeS$ appears to vary inversely with temperature. For example, about 2 volts is required at 440°C., while about 2.2 volts charge produces $FeS$ at 380°C. However, in cells employing iron current collector material, the higher cutoff voltages would tend to oxidize the iron and degrade the current collector structure.

SUMMARY OF THE INVENTION

Therefore, in view of the problems associated with the prior cathode compositions using $FeS$ as the primary cathode reactant, it is an object of the present invention to provide a cathode reactant composition including $FeS$ that exhibits improved cell performance.

It is also an object to provide an improved cathode composition including $FeS$ that provides increased power density at high current densities.

It is a further object to provide a cathode composition including $FeS$ that can be employed within a high-temperature electrochemical cell with increased capacity and utilization of reactant at high current densities.

In accordance with the present invention, a secondary, high-temperature electrochemical cell is presented including an alkali metal reactant in the anode, a cathode reactant composition including $FeS$ in the cathode and an electrolyte containing ions of the alkali metal between the two electrodes. The cathode reactant composition comprises a mixture of a major proportion by weight $FeS$ and a minor proportion by weight $Cu_2S$.

BRIEF DESCRIPTION OF THE DRAWINGS

The present invention is illustrated in the accompanying drawings wherein:

FIG. 3 is a graph showing the capacity, temperature and current density of an electrochemical cell including $FeS$ and a minor proportion of $Cu_2S$ as the cathode reactant.

FIG. 4 is a graph of cell current density v cell capacity presenting comparison of the two electrochemical cells of FIGS. 2 and 3.

DETAILED DESCRIPTION OF THE PREFERRED EMBODIMENT

Figure 1:
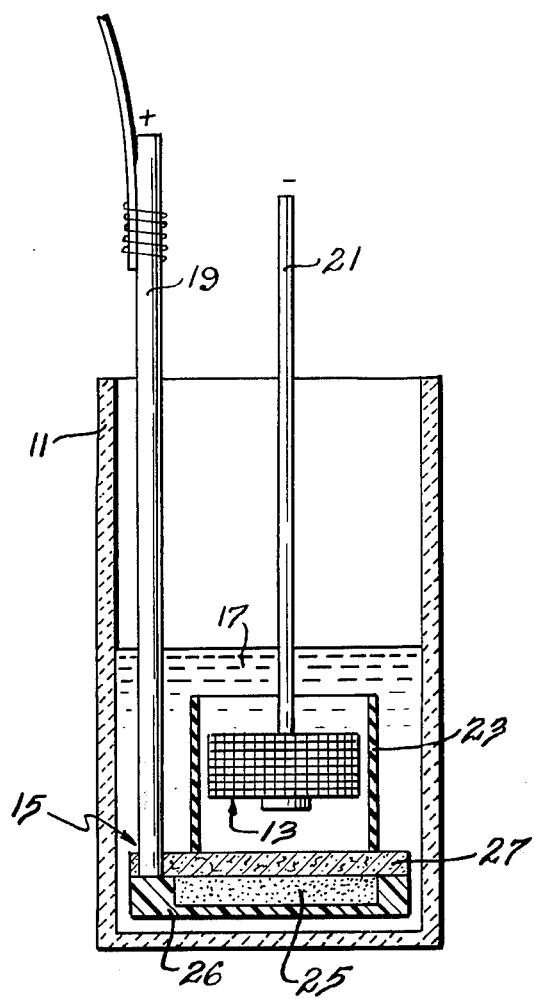
FIG. 1 is an elevation view of a laboratory electrochemical cell employed to test the present invention.

In FIG. 1, an experimental electrochemical cell is shown contained within a ceramic crucible 11. The cell includes an anode 13 (negative electrode), a cathode 15 (positive electrode) separated or submerged within a molten salt electrolyte 17. Electrical conductors 19 and 21 extend from the cathode and anode, respectively, for connection to electrical instrumentation (not shown) for evaluating the cell.

The anode 13 submerged within electrolyte 17 is supported above the cathode by electrical conductor 21. It is surrounded by a cylinder of electrically insulative material 23 such as beryllia. This prevents electrical shorting of the cell through any loose electrode materials that may have escaped during operation.

The anode as shown can be a porous substrate material of such as stainless steel in the form of felt, foam or wool impregnated with an anode reactant such as molten lithium or sodium. The anode might also comprise a solid porous substrate of lithium-aluminum alloy or other alkali metal alloys that are solid at the cell operating temperature, e.g. 375° to 500°C.

The electrolyte 17 that surrounds the two electrodes can be a eutectic salt composition that is molten at the cell operating temperature. Electrolytes such as eutectic compositions of LiCl-KCl or LiCl-LiF-KBr salts have been found to be suitable for this purpose. Various other suitable electrolytic salts can be selected from those listed in U.S. Pat. No. 3,488,221 cited above.

Cathode 15 is illustrated as a closed structure with a central chamber for containing the cathode reactant composition 25. The cathode structure as illustrated and as used in some of the experimental tests demonstrating the present invention is a graphite cup 26 having an upper porous graphite cover 27 to permit permeation of the electrolytic salt.

In practice, various cell designs may be used with the improved cathode reactant composition of the present invention. The cell of FIG. 1 merely represents an example of the type cell used experimentally to test and prove the operability of the present invention. One other, and perhaps more practical, cell design which could be used in making up electrochemical batteries for off-peak storage of electrical power or as a power source for an electric vehicle is illustrated and described in the assignee's copending patent application Ser. No. 416,311 cited above.

The positive electrode composition illustrated at 25 in FIG. 1 is a uniform mixture of FeS and $Cu_2S$. In some instances it is desirable to add an inert, electrically conductive material such as powdered iron, iron filings or powdered carbon to enhance current collection within the composition. Solid conductors of iron or other suitable inert, electrically conducting materials are also often employed within the composition to provide good electrical conduction to the electrode terminals.

The proportion of the active materials or reactants, FeS and $Cu_2S$, are selected such that a minimum quantity of $Cu_2S$ is employed with maximum FeS to effectuate a substantial increase in cell capacity, power and reactant utilization. It is expected that a minimum of 5% $Cu_2S$ by weight will be required for this purpose. Large ratios of $Cu_2S$ to FeS are not only not preferred but are also unsuitable for obtaining the benefits of the present invention, due to, for instance, the higher equivalent weight of $Cu_2S$. The present invention comprehends positive electrode compositions containing major proportions by weight of FeS and minor proportions by weight $Cu_2S$, that is, within a range of about 5% to about 35% by weight $Cu_2S$. From the experimental results that have been obtained, it is seen that substantial and unexpected improvement in cell performance occurs with positive electrode compositions containing 16 to 20% by weight $Cu_2S$ additions into FeS.

In providing the improved electrode compositions, a uniform and homogeneous blend of FeS and $Cu_2S$ is prepared. Fine powders, e.g. about 100 to 400 microns size, of each of these constituents can be thoroughly blended into a uniform mixture. It is of importance that no large domains of FeS are left to react with the electrolyte to form the solid J phase.

One manner of ensuring a near uniform composition of FeS and $Cu_2S$ is to melt powders of the materials in the desired proportions at about 1200°C. and form a molten solution. After thorough blending, the melt is frozen rapidly by casting in a cold metal mold of sufficient mass and heat capacity to cool the melt to about 900°C. in about 3 minutes. The rapid solidification produces a solid ingot with a minimum amount of macroscopic nonuniformity. The ingot contains a solid solution of $Cu_2S$ in FeS and one or more ternary Cu-Fe-S phases such as chalcopyrite, $CuFeS_2$ and bornite, $Cu_5FeS_4$. The cooled ingot, having a near uniform composition, is ground to a fine powder of about 100 to 400 microns particle size and blended thoroughly. Most of the individual particles will contain both a solid solution of $Cu_2S$ in FeS and one or more ternary phases, since the crystal structure formed by this method will be of smaller scale than these particle sizes.

Although the invention as described and claimed herein is directed to compositions of $Cu_2S$ and FeS as positive electrode materials, various other additives to FeS and $FeS_2$ are also contemplated for the production of improved positive electrodes. For instance, transition metal sulfides such as those of cobalt and nickel might also be added to FeS in minor proportions to enhance the performance of the positive electrode within a secondary, high-temperature electrochemical cell. Several of these transition metal sulfides have been suggested by the applicants as possible positive electrode reactants along with combinations of $Cu_2S$ and FeS in "Extended Abstracts of the Battery Division: The Electrochemical Society", Fall meeting, New York, N. Y., Oct. 13–17, 1974.

In order to demonstrate the present invention, a number of cells similar to that illustrated and described in FIG. 1 were set up and operated with various cathode compositions. The first of the cells employed only FeS powder as the active cathode material, another employed only $Cu_2S$ and the remaining cells included a mixture of $Cu_2S$ and FeS. One of the cells designated (K-1) used a commercial matte containing both $Cu_2S$ and FeS as the positive electrode material. This type matte is routinely produced in an early separation step in the recovery of copper metal from ore. The ore is melted and iron silicate slag removed, leaving the heavier molten matte of primarily $Cu_2S$ and FeS with a few percent of other metallic sulfides and impurities.

Each of the cells had a negative electrode area of about 5 cm² and a positive electrode area of about 4.75 cm². The negative electrodes included a substrate and current collector of porous stainless steel Feltmetal (a trademark) impregnated with molten lithium metal at the cell operating temperature. The interelectrode spacing in each cell was about 1 cm.

Tables I, II and III are given below to summarize the characteristics of these electrochemical cells. Table I gives the physical characteristics of the over-all cell, while Table II shows the composition and source of the positive electrode materials. Table III gives some of the electrical performance characteristics for each of these five cells.

from the electrolyte, it can cause the crystallization of an approximately equivalent amount of LiCl, thus reducing the amount of molten electrolyte associated with the positive electrode. At the lower operating temperatures (e.g. 380°–450°C.), pockets or crusts of solidified LiCl could be formed within the positive electrode to dampen its performance.

One particular characteristic associated with the J phase and observed with the Li/FeS cells is that at sufficiently high charge voltages it can be converted to FeS. At 380°C. this appeared to occur at about 2.2

TABLE I

| Cell Designation | Li/FeS (1) | Li/FeS-$Cu_2S$ (2) | Li/FeS-$Cu_2S$ (K-1) | Li/$Cu_2S$ (3) | Li/FeS-$Cu_2S$ (4) |
|---|---|---|---|---|---|
| Negative Electrode | | | | | |
| Wt. Li, g (approx.) | 1.3 | 1.2 | 1.0 | 1.2 | 1.3 |
| Theor. capacity, A-hr (approx.) | 5.0 | 4.6 | 3.9 | 4.6 | 5.0 |
| Positive Electrode | | | | | |
| Wt. of active material, g | 1.7 | 1.8 | 2.0 | 1.5 | 2.0 |
| Theor. capacity, A-hr | 1.04 | 1.0 | 0.90 | 0.5 | 1.12 |
| Theor. capacity density, A-hr/$cm^2$ | 0.22 | 0.21 | 0.19 | 0.1 | 0.21 |
| Powdered carbon, g (Current collector) | None | 0.5 | 0.2 | 1.0 | None |
| Electrolyte - LiCl-KCl, g | 99.7 | 87.1 | 95.7 | 89.8 | 92.6 |
| Operating Temperature, °C. | 387–436 | 389–437 | 412–430 | 380–433 | 420 |

TABLE II

| Cell Designation | Source of Electrode Material | Composition of Electrode Material | | Equiv. Weight |
|---|---|---|---|---|
| | | Wt. % $Cu_2S$ | $x^b$ | |
| Li/FeS (1) | FeS powder | 0 | 0 | 43.95 |
| Li/FeS-$Cu_2S$ (2) | FeS and $Cu_2S$ powders melted to form an ingot which was ground to form a powder | 20.0$^a$ | 0.121 | 48.27 |
| Li/FeS-$Cu_2S$ (K-1) | The as-received powder matte obtained from Kennecott Copper Co. | 31.8$^c$ | 0.216$^d$ | 51.64$^e$ |
| Li/$Cu_2S$ (3) | $Cu_2S$ powder | 100 | 1.0 | 79.57 |
| Li/FeS-$Cu_2S$ (4) | FeS and $Cu_2S$ powders, physically mixed | 16.8$^a$ | 0.100 | 47.52 |

$^a$Balance from 100 is FeS
$^b$The value of x in the general formula: $Fe_{1-x}Cu_{2x}S$
$^c$Wt. % FeS = 63.9, balance of 4.3% = impurities
$^d$The impurities were ignored in calculating x for this matte.
$^e$The equivalent weight for the FeS-$Cu_2S$ component of the matte.

TABLE III

| Cell Deisgnation | Li/FeS (1) | Li/FeS-$Cu_2S$ (2) | Li/FeS-$Cu_2S$ (K-1) | Li/$Cu_2S$ (3) | Li/FeS-$Cu_2S$ (4) |
|---|---|---|---|---|---|
| Current Density, mA/$cm^2$ | | | | | |
| Discharge | 30–40 | 30–40 | 21–38 | About 30 | 25–38 |
| Charge | 30–40 | 30–40 | 21–38 | About 30 | 25–38 |
| Cutoff Voltage, volts | | | | | |
| Discharge | 1.06 | 0.95 | 1.02 | 1.0 | 1.05 |
| Charge | 2.0 | 1.927 | 1.975 | 1.92 | 1.96 |
| Number of Completed Cycles | 9 | 17 | 9 | 23 | 8 |
| Avg. Capacity, % of Theor.$^a$ | | | | | |
| Discharge | 77.3 | 79.5 | b | 46 | 89.2 |
| Charge | 79 | 83.2 | b | 47 | 95.0 |
| Cell Termination Voltage | 2.3 | 1.93 | 1.70 | | 1.96 |
| Phases observed in fully charged positive electrode | J, FeS | FeS, J | $Li_2FeS_2$ | | FeS, $Li_2FeS_2$ |

$^a$Based on the reactions: 2 Li + FeS → $Li_2S$ + Fe and $Cu_2S$ + 2 Li → $Li_2S$ + 2 Cu.
$^b$Data beyond cycle two were poor because of Li electrode dewetting and are not included.

The performance tests conducted with the Le/FeS (1) and other similar Li/FeS cells indicate that their characteristics vary substantially with temperature. This may be due to the formation of the J (tentatively $K_2Fe_7S_8$) phase in the fully charged electrode. Not only is the J phase a solid material at the cell operating temperature, but in its formation by removing KCl volts (IR included), while at 490°C. a charge voltage of only about 1.7 volts (IR included) appeared to produce FeS. Consequently, in plots of charge voltage versus time the lower temperature cells show two plateaus, one for the conversion of the cell reaction product to J phase and the second plateau representing the conversion of J phase to FeS. Both of these conversions appear to occur at about the same voltage for cell temperatures of 490°C. and above. The higher charge voltages, however, are undesirable within a cell containing iron as current collector material, because of its possible oxidation to $FeCl_2$. In addition, the higher operating temperatures are to be avoided in order to extend the life of electrical insulators and electrode feedthrough components.

An examination of Table III, showing the results of the operation of the five cells, reveals substantial improvement for the cells including small weight percentages of $Cu_2S$ additive to the FeS positive electrode material. In cell 1, having only the FeS as the positive electrode composition, the fully charged positive electrode included both FeS and J phase, but it was necessary to employ elevated charge voltage at the cell termination (2.3 volts) to obtain conversion to FeS. In cell 2, having 20 wt. % $Cu_2S$, some J phase was observed, but in a substantially reduced amount to that found in previous FeS electrodes charged at the same voltages and temperatures. In cells K-1 and 4, having approximately 32 and 17 wt. % $Cu_2S$, no J phase was detected even at the reduced termination voltages.

It is also seen from Table III that improvement in the utilization of the positive electrode material, that is, the average capacity as a percent of theoretical, results from the addition of minor percentages of $Cu_2S$ to the FeS positive electrode material. This is a completely unexpected result, as the average capacity of cell 3 employing $Cu_2S$ alone as a positive electrode reactant exhibits rather poor utilization of the positive electrode material. It is also to be noted that these increases in utilization occur at low current densities, e.g. 20 to 40 $mA/cm^2$. More substantial improvements are to be described below in conjunction with tests conducted at higher current densities.

In order to further illustrate the improvement of the $Cu_2S$ additions in the positive electrodes, Table IV compares other features of three of the above cells at the lower operating temperatures (385°–390°C.). The data of Table IV was obtained from a linear plot of short-time voltage and current reading for a half dozen or more points between the open circuit voltage and about a 1 volt cutoff on discharge. The average power density of the cell is obtained by these voltage-current measurements at 1 volt on the linear plot.

TABLE IV

| % by wt. $Cu_2S$ | Open circuit volts | Current at 1 volt cutoff $mA/cm^2$ | Power density at 1 volt $W/cm^2$ |
| --- | --- | --- | --- |
| 0 | 1.69 | 124 | 0.124 |
| 20 | 1.72 | 181 | 0.181 |
| 100 | 1.69 | 173 | 0.173 |

Table IV clearly shows that the short-time current density at 1 volt of a cell employing an FeS electrode can be increased to about that obtainable with a $Cu_2S$ electrode merely by adding a minor proportion of $Cu_2S$ to the FeS. This, of course, means that the cell resistance has been lowered to substantially below that which would be expected by the addition of a small amount of $Cu_2S$. It is also seen from Table IV that the average power density of the cell is unexpectedly increased to about that with the $Cu_2S$ electrode while still retaining a major proportion of FeS. The composition of FeS-$Cu_2S$ is of substantial advantage over $Cu_2S$ alone because of its lower weight per unit capacity and its greater availability.

In order to further demonstrate the improvement afforded by use of a $Cu_2S$ additive to an FeS positive electrode composition, two nearly identical cells DS-11 and DS-13 were operated. The structure of these cells was somewhat different from that shown in FIG. 1 in that the positions of the positive and negative electrodes were reversed. Also the negative electrode comprised a lithium-aluminum alloy supported on the bottom of the cell and covered with a boron nitride interelectrode separator. The positive electrode was supported above the negative electrode and included an iron mesh basket lined with zirconia cloth for containing the positive electrode composition. The first of these cells, designated DS-11, included only FeS in the cathode composition, while the second cell, designated DS-13, included a uniform mixture of 16.8 wt. % $Cu_2S$ (10 mol %) and the remainder FeS. Other details of these cells are shown in Table V.

TABLE V

| Cell No. | DS-11 | DS-13 |
| --- | --- | --- |
| Cell Type | LiAl/FeS | LiAl/FeS-$Cu_2S$ |
| Positive electrode | | |
| Area, $cm^2$ | 25 | 25 |
| Theor. capacity amp-hr | 25 | 25 |
| Wt. $Cu_2S$, g | 0 | 7.1 |
| Wt. FeS, g | 44 | 37.1 |
| Negative electrode | | |
| Area, $cm^2$ | 38 | 38 |
| Theor. capacity amp-hr | 40 | 40 |
| Electrolyte | LiCl-KCl | LiCl-KCl |
| Interelectrode distance, cm | 0.5 | 0.5 |
| Operating temperature | 441–500°C. | 440–460 |
| Cutoff voltage | | |
| Charge | 1.8 | 1.8 |
| Discharge | 0.7 | 0.7 |

Figure 2:
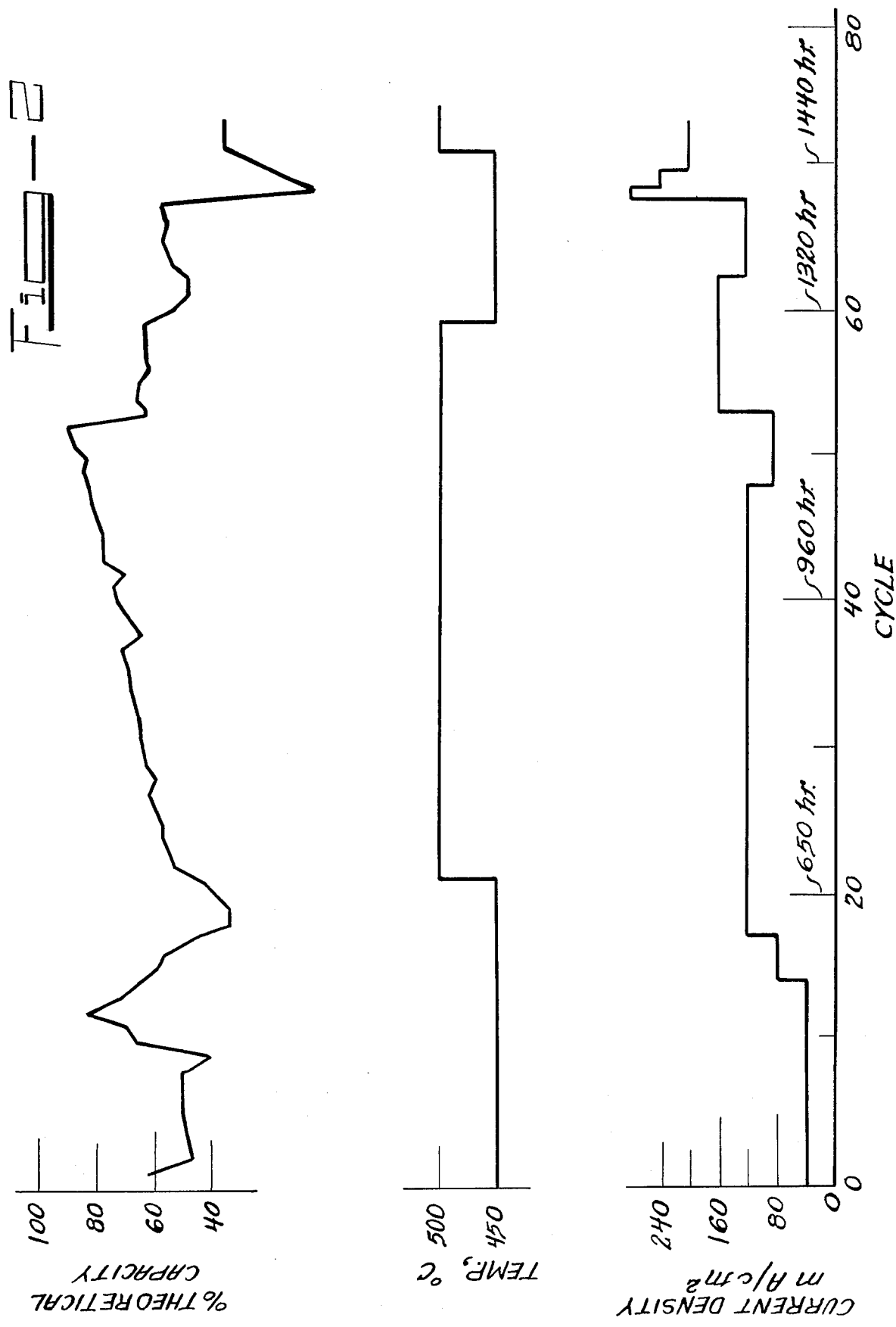
FIG. 2 is a graph showing the capacity, temperature and current density of an electrochemical cell including $FeS$ as the cathode reactant.

During the operation of cell DS-11 with only FeS as a positive electrode material, the percent of theoretical capacity, that is, percent utilization, was found to be rather low at the higher current densities, e.g. 35% at 120 milliamps/$cm^2$. This indicated the high diffusion overvoltage within the electrodes. By raising the cell operating temperature to 500°C. a substantial improvement in capacity was realized gradually. After about 28 cycles at this temperature, 80% utilization was achieved. On subsequently lowering the temperature again to 450°C., the utilization dropped slightly to about 55% at 120 milliamps/$cm^2$. The complete history of cell DS-11 is presented in FIG. 2.

Cell DS-13 was constructed to be nearly identical to cell DS-11, except that approximately 10 mol % $Cu_2S$ (16.8 wt. %) was included with FeS as the positive electrode composition. The cell was operated for over 800 hours at near 450°C. After a short initial break-in period of high resistance, the cell operated with a percent utilization of active material in the positive electrode of about 75% at 120 $mA/cm^2$ to about 65% at 160 $mA/cm^2$. FIG. 3 is presented as a record of this cell's history. As a result of including the $Cu_2S$ as an additive in the positive electrode material, performance of this cell is essentially identical to that of cell DS-11 at the higher temperature of 500°C.

FIG. 4 illustrates the improvement in capacity attributable to the addition of $Cu_2S$ to the FeS positive electrode composition. The performance of the cell having only FeS as the positive electrode reactant at 500°C. nearly coincides with that shown in FIG. 4 for the FeS-$Cu_2S$ reactant at 450°C. Thus, by adding $Cu_2S$ in a minor proportion to the positive electrode composition, a capacity increase equivalent to that obtained by a 50°C. increase in temperature is achieved.

It can therefore be seen from the above description and experimental results that the new and improved positive electrode composition of the present invention provides increased utilization, lower resistance and increased power over that in comparable cells using only the individual positive electrode reactants. The use of minor percentages of $Cu_2S$ within an FeS cathode achieves performance equivalent to that previously achievable only at high temperatures. The addition of $Cu_2S$ to the FeS composition appears to minimize or eliminate the formation of a solid J phase that also incorporated electrolyte constituents and thereby possibly produced domains having elevated electrolyte melting points. The results are completely unexpected, as the performance of cells having compositions of FeS and $Cu_2S$ in the positive electrodes is shown to exceed that of cells having either one of these sulfides alone as reactants.

The embodiments of the invention in which an exclusive property or privilege is claimed are defined as follows:

1. In a secondary, high-temperature electrochemical cell including an alkali metal reactant in the anode, a cathode reactant composition including a chalcogen compound in the cathode and an electrolyte containing ions of said alkali metal, the improvement wherein said cathode reactant composition comprises a mixture of a major proportion by weight FeS and a minor proportion by weight $Cu_2S$.

2. The improvement of claim 1 wherein said cathode reactant composition comprises 80% to 84% FeS and 16% to 20% $Cu_2S$ by weight.

3. The improvement of claim 1 wherein said cathode reactant composition comprises a powdered mixture of FeS particles and $Cu_2S$ particles.

4. The improvement of claim 1 wherein said cathode reactant composition is a powder of about 100 to 400 microns individual particle size, and wherein most of said individual particles comprises a solid solution of $Cu_2S$ in FeS, and ternary phases of Fe, Cu and S.

5. The improvement of claim 1 wherein said cathode reactant composition is a uniform mixture of FeS and $Cu_2S$ formed by melting said FeS and $Cu_2S$ together at 1200°C., uniformly blending said melt, cooling to less than about 900°C. in less than about 3 minutes to solidify said melt into an ingot and grinding said ingot into a powder of less than 400 microns average particle size.

6. The improvement of claim 1 wherein said cathode composition includes an inert, electrically conductive material contacting said FeS and $Cu_2S$.

7. The improvement of claim 6 wherein said inert, electrically conductive material is iron.

* * * * *